(12) United States Patent
Lehmuskallio et al.

(10) Patent No.: US 7,400,295 B2
(45) Date of Patent: Jul. 15, 2008

(54) METHOD, SYSTEM AND SERVICE PRODUCT FOR IDENTIFICATION OF OBJECTS

(76) Inventors: Eija Lehmuskallio, Mankinkuja 6, FI-02780 Espoo (FI); Jouko Lehmuskallio, Mankinkuja 6, FI-02780 Espoo (FI)

( * ) Notice: Subject to any disclaimer, the term of this patent is extended or adjusted under 35 U.S.C. 154(b) by 0 days.

(21) Appl. No.: 11/574,074

(22) PCT Filed: May 8, 2006

(86) PCT No.: PCT/FI2006/000148

§ 371 (c)(1),
(2), (4) Date: Feb. 22, 2007

(87) PCT Pub. No.: WO2006/120286

PCT Pub. Date: Nov. 16, 2006

(65) Prior Publication Data

US 2007/0225899 A1  Sep. 27, 2007

(30) Foreign Application Priority Data

May 9, 2005  (FI)  ................................... 20050492

(51) Int. Cl.
*G01S 5/14* (2006.01)
*G01C 21/00* (2006.01)
(52) U.S. Cl. .................. 342/357.13; 701/200
(58) Field of Classification Search .............................. 342/357.01–357.17
See application file for complete search history.

(56) References Cited

U.S. PATENT DOCUMENTS 4,972,616 A * 11/1990 Doll ............................. 40/645
6,553,310 B1  4/2003 Lopke 2002/0003495 A1  1/2002 Johnstone (Continued)

FOREIGN PATENT DOCUMENTS

DE  4312310  3/1995

(Continued)

OTHER PUBLICATIONS

Davies N. et al, "Using and Determining Location in a Context-Sensitive Tour Guide" Computer IEEE Service Center, Los Alamitos, CA, US: Aug. 2001 35-41.

*Primary Examiner*—Thomas H. Tarcza
*Assistant Examiner*—Harry Liu
(74) *Attorney, Agent, or Firm*—Rolf Fasth; Fasth Law Offices

(57) ABSTRACT

The objects are identified on the basis of location and characteristics. The method is performed by a user device and a service product offering a service with which objects are identified. The object to be identified is positioned and the position of the object is informed to the service to which the user device has connected. The user selects a characteristic presented by the service for an object to be identified. A message containing the position of the object to be identified and the selected characteristic are then sent from the user device to the service product. The service fetches information on the basis of the position of the object and the selected characteristic from a database. The user device with a connection to said service and a service has a database with objects classified on the basis of their position and their characteristic.

19 Claims, 6 Drawing Sheets

U.S. PATENT DOCUMENTS

| | | |
|---|---|---|
| 2002/0049742 A1 | 4/2002 | Chan |
| 2002/0084130 A1* | 7/2002 | Der Ghazarian et al. .... 180/272 |
| 2003/0126150 A1 | 7/2003 | Chan |
| 2003/0159633 A1 | 8/2003 | Upadhyaya |
| 2003/0206133 A1 | 11/2003 | Cheng |
| 2004/0160635 A1* | 8/2004 | Ikeda et al. ................ 358/1.15 |
| 2004/0189517 A1* | 9/2004 | Pande et al. ............ 342/357.06 |
| 2004/0203902 A1* | 10/2004 | Wilson et al. ............ 455/456.1 |
| 2004/0247161 A1* | 12/2004 | Storm ........................ 382/117 |
| 2004/0254811 A1* | 12/2004 | Horstemeyer .................. 705/1 |
| 2006/0089792 A1* | 4/2006 | Manber et al. ............... 701/207 |
| 2006/0136124 A1* | 6/2006 | Adamczyk et al. .......... 701/207 |
| 2006/0261931 A1* | 11/2006 | Cheng ..................... 340/426.1 |
| 2007/0140439 A1* | 6/2007 | Olrik et al. .................. 379/67.1 |
| 2007/0149208 A1* | 6/2007 | Syrbe et al. ............... 455/456.1 |

FOREIGN PATENT DOCUMENTS

| | | |
|---|---|---|
| JP | 2000193481 | 7/2000 |
| WO | 0049530 | 8/2000 |

* cited by examiner

Wood Crane's-bill — *Geranium sylvaticum*

FAMILY: Geranium Family – Genraniaceae
HEIGHT: 25-50 (10-20 in.)
FLOWER: Regular (actinomorphic), large. Petals free, five, reddish-purple to white. Sepals free, five, glandular-hairy, with membranous margins, tipped by a short bristle. Pistil of five fused carpels. Stamens ten. Flowers in pairs, stalks densely glandular-hairy.
LEAVES: Basal leaves long-stalked, stem leaves stalkless. Blade roundish in outline, palmately lobed and veined, lobes broad, large-toothed, hairy. Stipules brown, hairless, sharp-pointed.
FRUIT: A glandular-hairy, five-parted schizocarp.

FIG. 5

**Wood Crane's-bill – *Geranium sylvaticum***

The wood crane's-bill occurs throughout Finland, although it is concentrated in rich areas and Avoids poor soils. In Southern Finland it is most abundant in rich mixed forests and damp meadows. In the north it is confined to the most luxuriant forests, and is one of the species indicating eutrophic conditions in mires. The wood crane's-bill is a very variable species. The flower colour varies so that individuals with the deepest purple flowers are mostly concentrated in South Finland, and flowers with lighter colours in Kainuu and northwards. The corolla of the wood crane's-bill is large, petals clearly longer than the sepals. In this sense it differs from some other crane's-bills which have smaller flowers.

| Distribution map | Miscellaneous notes | Print |

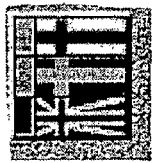 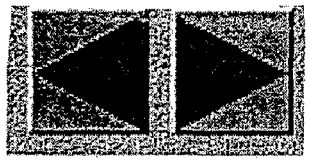

FIG. 6

METHOD, SYSTEM AND SERVICE PRODUCT FOR IDENTIFICATION OF OBJECTS

PRIOR APPLICATIONS

This is a U.S. national phase patent application that claims priority from PCT/FI2006/000148, filed 8 May 2006, that claims priority from Finish Faterit Application No. 20050492, filed 9 May 2005.

TECHNICAL FIELD

The present invention is concerned with a method, system and service product for identification of objects, especially for identification of objects in the nature, such as plants, animals and minerals.

BACKGROUND

People walking in the nature might want to identify different objects and phenomena in nature, such as plants, mushrooms, stones, minerals, butterflies, insects, animals and phenomena in the sky. Localization of a place is another problem often faced with when trying to figure out where you are.

Trying to figure out where you are is probably one of the oldest pastimes of people. Navigation and positioning are crucial to so many activities and yet the process has always been quite cumbersome. Along with the increasing use of mobile stations, there are nowadays methods with which positioning or localisation can be performed.

GPS is the first positioning system to offer highly precise location data for any point on the planet, in any weather. The most important application of GPS is the simple determination of a "position" or "location".

Technically, The Global Positioning System (GPS) is a worldwide radio-navigation system formed from a constellation of 24 satellites and their ground stations. The idea behind GPS is to use satellites in space as reference points for locations on earth. GPS uses the satellites as reference points to calculate positions accurate to a matter of meters, with advanced forms of GPS even measurements better than a centimeter can be made. These days GPS is finding its way into cars, boats, planes, construction equipment, movie making gear, farm machinery, even laptop computers and all mobile stations. A GPS signal contains exact information of e.g. the position of a GSM-phone.

GPS provides two levels of service, Standard Positioning Service (SPS) and the Precise Positioning Service (PPS). SPS is a positioning and timing service, which will be available to all GPS users on a continuous, worldwide basis with no direct charge. SPS provides a predictable positioning accuracy of 100 m (95%) horizontally and 156 m (95%) vertically and time transfer accuracy to UTC within 340 nanoseconds (95%). PPS is a highly accurate military positioning, velocity and timing service, which will be available on a continuous, worldwide basis to users authorized by the U.S.

To make use of GPS, a GPS receiver is needed. Many different types of receivers exist and have become less and less expensive in recent years. A GPS receiver "listens" for the signals that are broadcast from the satellites of the United States Department of Defense (DOD) Global Positioning System. Each satellite broadcasts information that contains the position of all satellites in the constellation. GPS receivers use the signals in order to determine the position of the satellites.

Users need to transform position data into a plane (flat) coordinate system, either to merge them with another data set, to plot a map of the GPS results, or to perform further calculations for such parameters as area, distance or direction. GPS receivers can usually report position information in more than one format. The most common format is latitude and longitude.

Together, the Global Positioning System and GPS receivers provide the means for determining position anywhere on the earth. A GPS configuration comprises a GPS receiver and antenna, and software to interface differentially corrected GPS data from the receiver to other electronic equipment.

The identification of objects and phenomena in nature is usually based on knowledge or by using books or sites on the internet for finding the desired information. When walking in nature it is, however, not practical to carry heavy books or computers, and even if a mobile station with access to internet would be available, most objects can not be identified very quickly, if even at all, due to the extensive amount of alternatives in big databases. The identification of different objects in these databases is based on photographs (and sometimes high resolution scanning) of the objects to be identified.

Hence, there is a need for a method with which an object can be identified fast and reliably at site when walking in e.g. the nature.

SUMMARY OF THE INVENTION

In the method of the invention, objects can be identified on the basis of location and one or more characteristics in an improved way. The method is performed by means of a user device and a service product offering a service with which objects can be identified. The object to be identified is positioned and the position of the object is informed to the service to which the user device has connected. The user of the user device selects one or more characteristics presented by the service for an object to be identified. One or more messages containing the position of the object to be identified and selected characteristic(s) are then sent from the user device to the service. The service fetches information on the basis of the position of the object and the selected characteristic(s) from a database. The fetched information is presented for the user device in the form of one or more alternative objects to be identified.

The system of the invention is characterized by a user device with means for establishing a connection to said service and a service comprising a database with objects classified on the basis of their position and their characteristic(s).

In the service product of the invention, there is a database with objects classified on the basis of their position and their characteristic(s).

There are different ways of performing the inventive idea. The service product can e.g. get the positioning and time information and the selected characteristics in different ways. Said information can be informed manually or automatically by means of GPS and in separate messages or in a combined message and in optional stages. The above mentioned order of the steps is thus not fixed.

The preferable embodiments of the invention have the characteristics of the subclaims.

Preferably, the database consists of local databases, an object menu for each local database and submenus on different levels for the object menu. It is practical to have a local database for different regions in a country. The objects to be identified are classified in the database on the basis of different characteristics in a hierarchic system by means of submenus. The submenus contain images, text or photographs of the objects and the images, text or photographs in the submenus describe the objects by pointing out certain characteristics.

The invention is primarily meant for identification of objects in the nature, such as plants, mushrooms, stones, minerals, butterflies, insects, animals and phenomena in the sky. It can, however, be extended to other suitable things, e.g. to identification of stars, planets, or different types of clouds, auroras etc, weather forecasts, other future forecasts, such as possible development of the local nature in question, and also for localization of sights, cities, villages etc.

When e.g. the service is used for identification of unknown plant species, the hierarchic structure of the database enables a very user-friendly interface. In such an embodiment, the user can see symbols (or descriptions, images or photographs) describing species characteristics given one after another and then choose the one(s) that best correspond(s) to the species he is trying to identify. In the case of wild plants, the symbols or the like (in a submenu) might e.g. describe the color of the corolla, the number of petals, the form of leaves or leaflets, the cross-section of the stem circular etc. As the user already has informed the location of the plant, either by means of the position of the mobile station or by sending the location information manually, the system excludes all plants not being within the region of localization and which do not exist at that time in the area in question. In this way, the identification is faster and the information that has to be sent over-the-air is less extensive.

Sometimes the identification is easier, whereby one selection from characteristics is enough in order to perform the identification. Sometimes, however, further characteristics are presented for the mobile station in more steps in order to be identified and sent to the service product before the final result or alternative(s) are presented for the mobile station. After every new given description, the service presents the number of possible species there still are and when the user feels that the amount of alternatives is reasonable he asks for and gets the pictures, names and description of each species the service has accepted. The results can also be shown without asking in some embodiments and if there is only one alternative to present. Each species can have several pictures and details for making the identification more exact. In case of a possible rarity, which the service informs about, the user can store the position in a memory of his device for the future.

The presented pictures, which describe characteristics and are stored in the database of the service product, can be made very detailed by a special method invented by the inventors. In this method, the picture of e.g. a plant to be identified later by the user is made by first preparing the plant in a special way. The fresh plant is pressed very carefully by avoiding destruction of any parts of the plant and then scanned in a good quality scanner and the scanned picture is stored in the database of the service product. In the service, any detail of the pictures presented can be zoomed for a better look at e.g. hairs (if they are e.g. curved or glandular) occurring in the plant in order to be compared to the living object at site by the user.

The presentation of the different characteristics and results and the service generally can of course be performed in a lot of different ways and is also a question of design. In addition to the alternatives of presentation of the characteristics of e.g. plants, it can especially be mentioned that e.g. the service language can be selected among many possibilities and the names of plants, bugs, butterflies etc are preferably also in Latin.

It is understandable that there are given requirements set to the user device so that all possibilities of the service could be made use of. The best possible benefits are achieved when the user device supports e.g. WAP or is a 3G device and have a color screen big enough in size. The bigger the screen, the better can all details be presented. The characteristics to be selected and the final results can, however, be presented for the user in different formats taking the capabilities of the user device into consideration. Preferably, the message containing the selected alternatives sent to the service provider also comprises information of terminal capabilities. The service then sends the information to the mobile station in a suitable form on the basis of the terminal capabilities.

Usually, the use of the invention takes place via internet and the user device is in connection with the service provider offering said service through internet.

The positioning of an object to be identified can be performed by manually informing the position of the object found to the service product.

The invention is, however, especially meant for use in connection with mobile stations and other wireless terminals as user device.

When said user device is a mobile station, the positioning of an object to be identified can advantageously be performed by positioning the mobile station. When the service gets the location information by a positioning system in the mobile station, the user does not have to enter the position, instead the service gets the position of the object (which corresponds to the position of the mobile station) directly. The mobile station is preferably a GSM phone or other wireless terminal supporting GPS.

The service product can be in the user device or the service product is requested from a service provider via a public network such as internet.

The invention is now described by means of some advantageous embodiments and examples, the details of which the invention is not restricted to.

FIGURES

FIG. 1 is an architecture view of an environment in which the invention can be implemented The objects are identified on the basis of location and characteristics. The method is performed by a user device and a service product offering a service with which objects are identified. The object to be identified is positioned and the position of the object is informed to the service to which the user device has connected. The user selects a characteristic presented by the service for an object to be identified. A message containing the position of the object to be identified and the selected characteristic are then sent from the user device to the service product. The service fetches information on the basis of the position of the object and the selected characteristic from a database. The user device with a connection to said service and a service has a database with objects classified on the basis of their position and their characteristic.

FIGS. 4-6 presents an example of how the database in the service product could appear for a user

DETAILED DESCRIPTION

Figure 1:
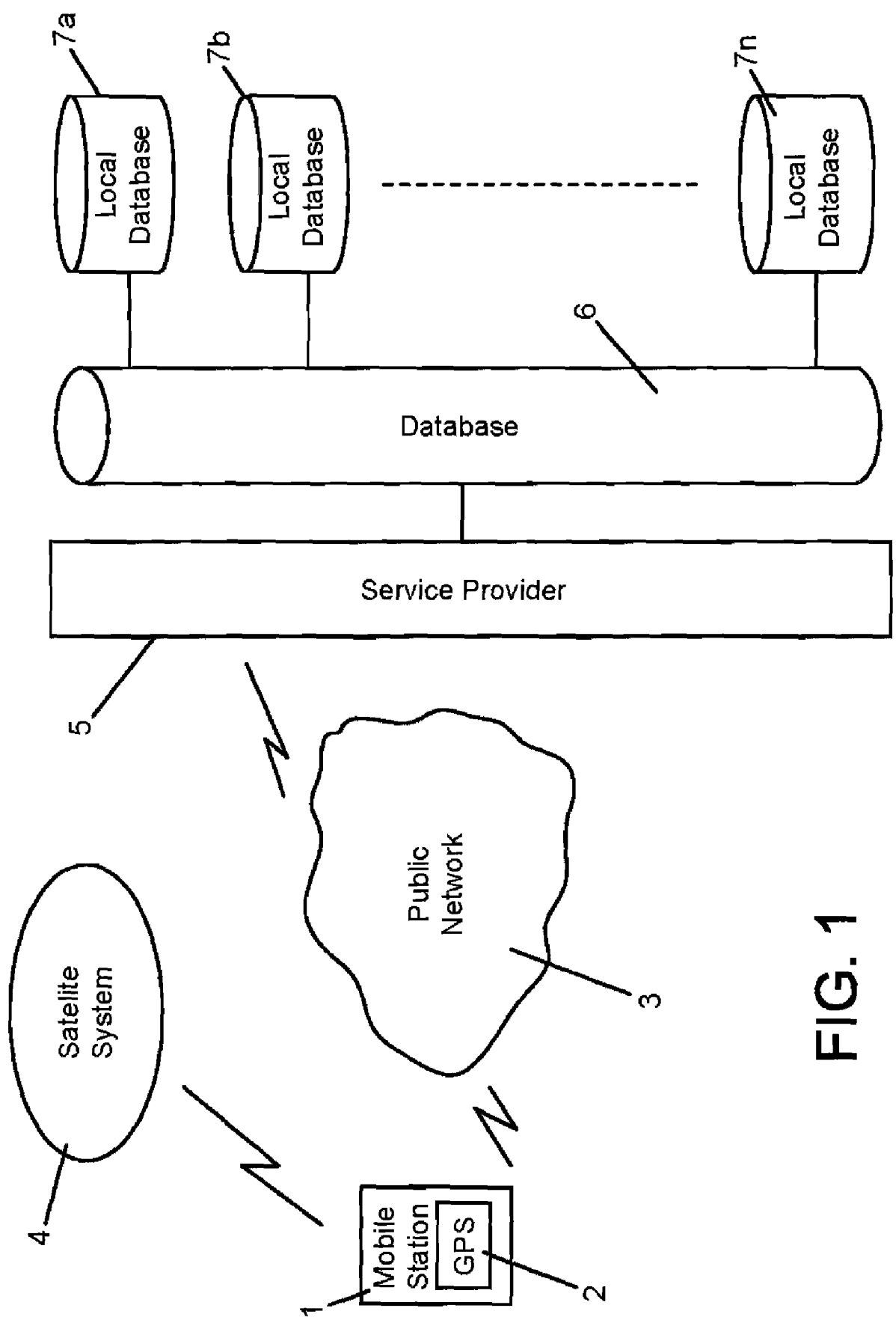

FIG. 1 is an architecture view of an environment in which the invention can be implemented. In this example, the user device is a mobile station 1 having a GPS receiver 2, with which the mobile station can be positioned via a satellite system 4. The mobile station 1 is preferably a GSM phone with access to a public network 3, such as the internet, via e.g. a WAP interface or the like. The mobile station communicates via the public network with a service provider 5 holding a service with a database 6. The database in turn is connected to local databases 7a-7n.

Figure 2:
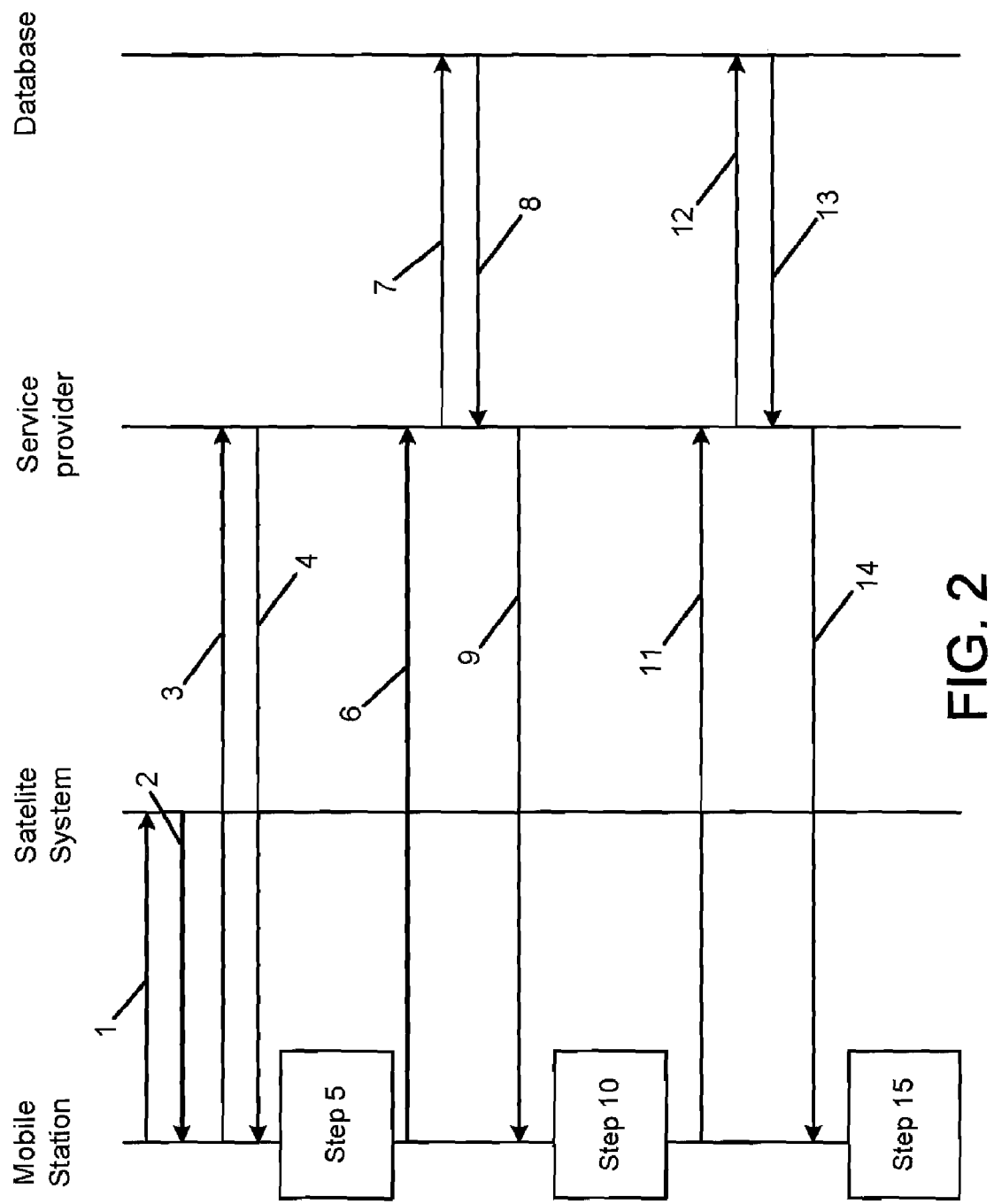
FIG. 2 is a signal diagram of an embodiment of the method of the invention

FIG. 2 is a signal diagram of an embodiment of the method of the invention. It is assumed that a user is walking in nature carrying a mobile phone with access to internet. Next, the user finds a plant he does not recognize and therefore would like to identify. As the user has a GPS receiver in the phone, the phone can be positioned by means of signals 1 and 2 through a GPS satellite system.

In signals 3 and 4, the user requests for respective gets a service from the service provider by means of which the plant found can be identified. The service is presented for the user in form of a menu of alternatives of what the user wish to identify. After that the user has to select if he e.g. wants to identify a plant, animal, insect, or stone etc., characteristics of such an object is presented next in form of e.g. symbols. From these symbols the user can select (by clicking) one or more that best match to the properties (characteristic) that describe the plant found. The steps of selecting is presented with reference number 5 in FIG. 2.

A message is then sent to the service provider in step 6 containing the position of the object, data of which position is received by means of the GPS receiver in the phone. Alternatively, said information is sent to the service in separate messages at optional stages of the method or even in signal 3. If there is no GPS receiver in the phone, then the user has to manually enter the position either by clicking on alternatives presented in the service or by giving coordinates. The message sent to the service provider (signal 3 or 6) also contains the information of the selected properties and optionally terminal capability information.

The service product has means (software) to combine position and time information with information of selected characteristics and can access the right local database by means of the information in the message of signal 6.

Information about possible plant alternatives matching the characteristics given is fetched from the local database in question with signals 7 and 8. The service product preferably also takes the season into consideration (time information) when fetching the information.

Preferably, the service product also has means to take the terminal capabilities of the user device into consideration in order to present the results and characteristics to the user in an optional format.

The result of this first search is sent to the user device in signal 9. The results show photograph(s) of one or more possible alternatives, which have the characteristics selected by the user and which occur at this season in question. The result might also show further characteristics to be selected to improve the search result.

It is possible that the user already can identify the plant, next step after step 9 being step 15. In step 10, the user can, however continue to select more detailed characteristics for the plant found and request for alternatives matching the new characteristics in step 11 to narrow the results to less alternatives if there were more than one possible alternative.

Possible plant alternatives matching the new characteristics given is again fetched from the local database in question with signals 12 and 13 and the results are presented for the user with signal 14.

In this example, it is now assumed that the user can identify the plant in step 15 either because there was only one alternative presented or then the user could identify the plant by means of the alternatives left.

The user might give more characteristics several times to the service product before the right alternative for identification occurs.

Figure 3:
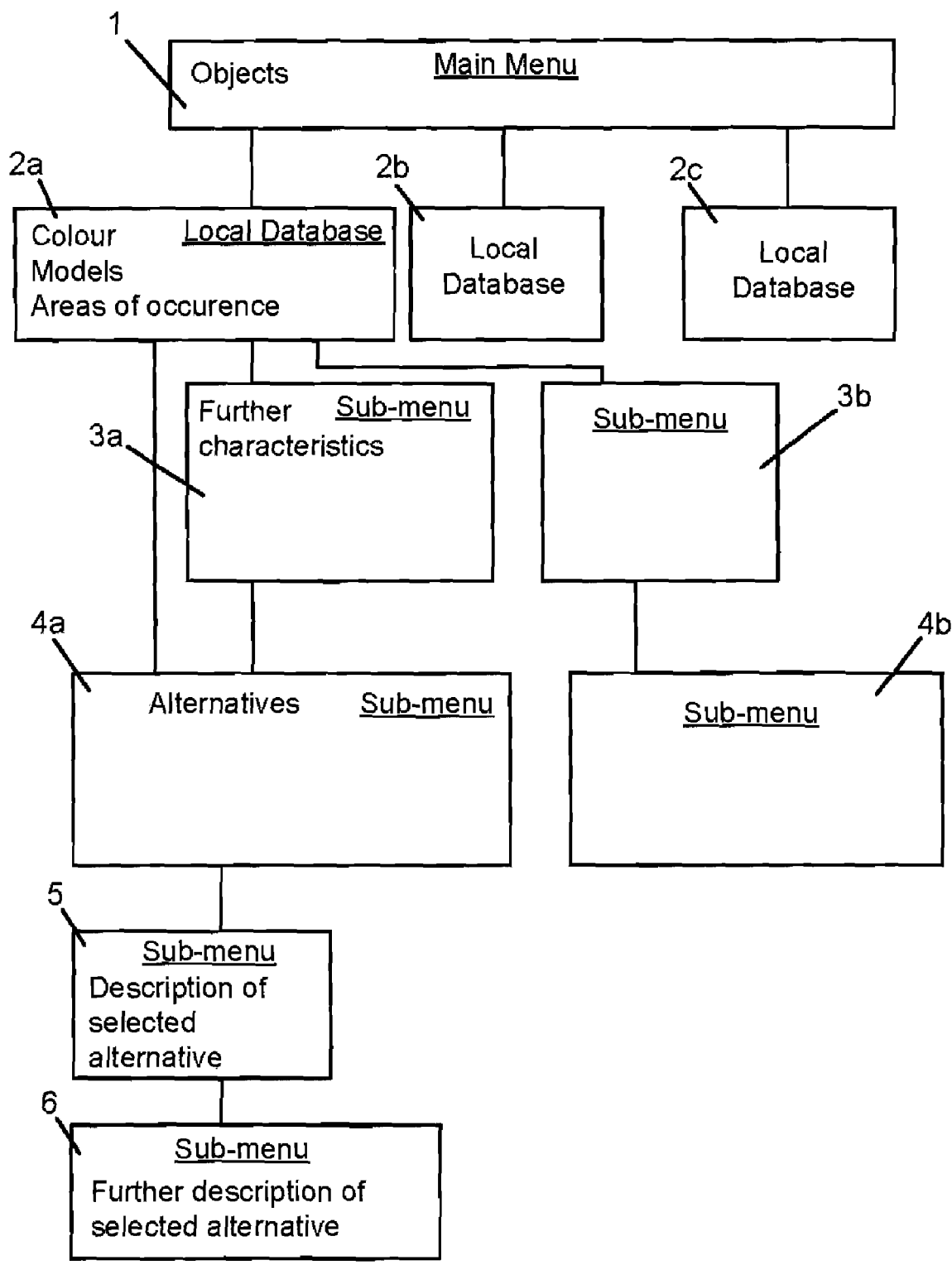
FIG. 3 is a principle view of the database of the service product of the invention

FIG. 3 is a principle view of a way to construct the database of the service product of the invention.

The main menu is marked with reference number 1 an comprises a selection of objects to be identified, such as Plants, Animals, Insects, Stones, Sights etc. in accordance with how the service provider has constructed the product. It is in this example assumed that the user selects a plant.

After that the user has selected the objects to be identified, one of the local databases 2a, 2b or 2c is presented for the user on the basis of the position of the object found and the season. In reality, there are usually more local databases, but FIG. 3 shows only three of clarity reasons. From the local database 2a, the user can in this example select the color, terrain (where found) and model of the plant he has found. In such an embodiment, wherein the user device is a wireless terminal and GPS is made use of, the service product gets the information of the position of the object directly and sometimes consequently also the terrain type or wherein the object was found or area of occurance.

Alternatives are presented for the user on the basis of his selections from the matching submenu 4a or 4b. If the user so wish he can select further characteristics from submenu 3 if he thinks that there are too many alternatives presented on the basis of the first selections only.

When an alternative has been selected for the identification, a description of an object can be fetched from submenu 5 and thereafter a more detailed description from submenu 6.

Figure 4:
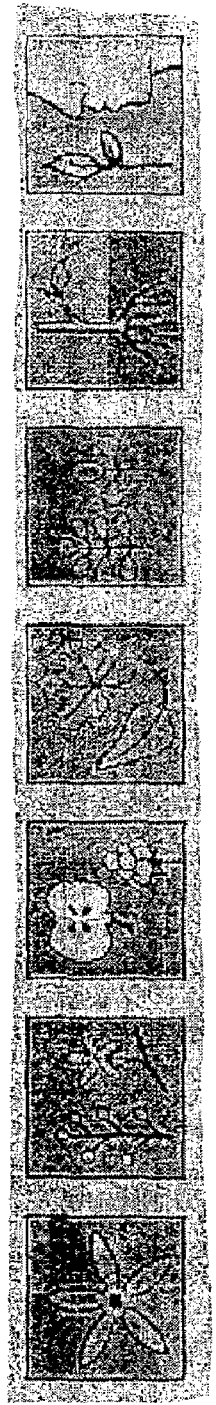
Figure 4:
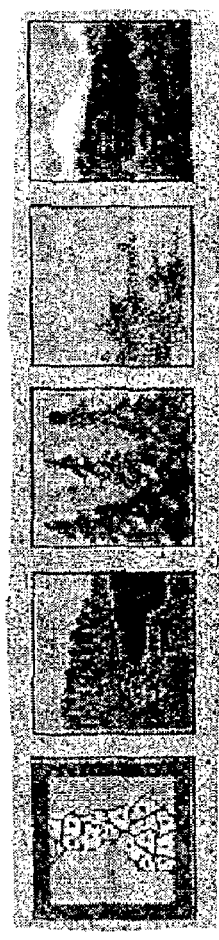
Figure 4:
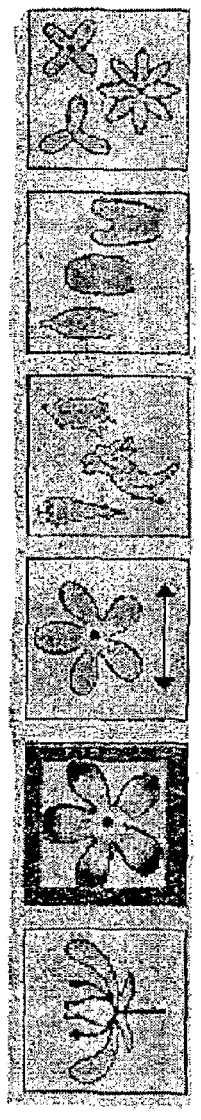
Figure 4:
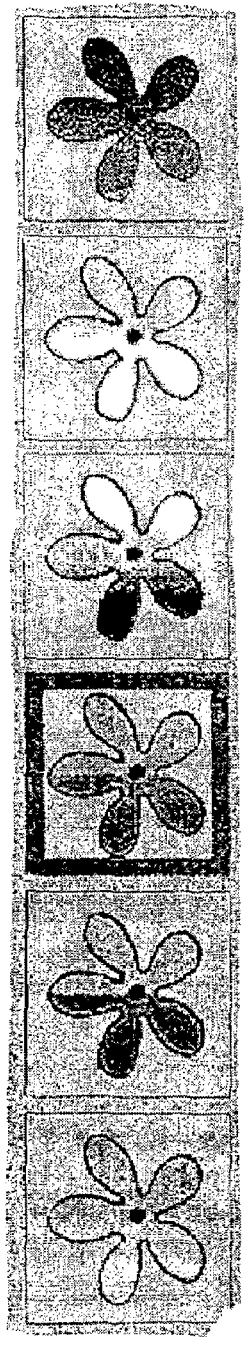

FIGS. 4-6 presents an example of how the menus of the database in the service product and results of the service could appear for a user.

With reference to FIG. 4 and like FIG. 3, the main menu corresponding to the one marked with reference number 1 in FIG. 3 comprises a selection of objects to be identified, which in FIG. 4 consist of Plants, Animals, Insects, and Minerals.

It is in this example assumed that the user selects a plant and therefore, one of the local databases, corresponding to the one marked with reference number 2 in FIG. 3, is presented for the user on the basis of the position of the object found and the season. The service product gets the information of the object and the time information either directly from the user device if it has a GPS receiver connected to the service or by manually entering said information by the user. In FIG. 4, submenu 2 presents 4 rows of characteristics to be selected by the user and they are presented as symbols (images). The top image row presents different forms for flower, fruit, leaf and root respective smell. The second row from top presents different areas of occurrence. The second row from bottom presents different flower forms. The fourth row presents different colors.

It is now assumed that the user's selection from each row on FIG. 4 matched a flower named Wood' Cranes's-bill (Germanium Sylvaticum) and an image of this plant is presented for the user (not shown).

The user can now fetch a description of this plant from submenu 5, which is presented in FIG. 5. A more detailed description can thereafter be fetched from submenu 6, which is presented in FIG. 6. FIG. 6 also shows some other features used in the service site, like a language selection and arrows to go back or further in the service. Furthermore, the result can, as can be seen in FIG. 6, be printed, and a distribution map and miscellanous notes can be fetched.

The example of FIGS. 4-6 is only an example for performing the service and many variations are possible. FIGS. 4-6 are made quite simple to make the presentation in this text clearer. In reality, the service product of the invention usually contains more submenus, characteristics and result alternatives as well as web site features than what is presented in these figures. All alternative ways of performing the invention in the scope of the claims are possible.

While the present invention has been described in accordance with preferred compositions and embodiments, it is to be understood that certain substitutions and alterations may he made thereto without departing from the spirit and scope of the following claims.

The invention claimed is:

1. A method for identification of objects on a basis of location and one or more characteristics by means of a user device and a service product provider offering a service with which objects are identified, comprising:
   determining a position of a user device of a user,
   the user sending a request message to a service provider requesting a service to identify objects,
   the service provider receiving the request message and selecting identifiable objects based on the position of the user device,
   the service provider sending a reply message to the user device, the reply message having a menu of identifiable objects,
   the user selecting an identifiable object from the menu, the user determining characteristics of the selected identifiable object,
   the user sending a selection message to the service provider,
   the selection message comprising the selected identifiable object and the characteristics of the selected identifiable object,
   the service provider receiving the selection message and selecting a local database based on the characteristics of the selected identifiable object, the local database having objects classified based on positions and characteristics of the objects,
   the service provider sending a request message to the local database,
   the service provider searching the local database and matching the characteristics of the selected identifiable object with the objects in the local database,
   selecting an object in the local database that match the characteristics of the selected identifiable object, and the service provider sending information about the selected object, obtained from the local database, to the user device.

2. The method of claim 1 wherein the user device is a mobile station, and the positioning of the identifiable object is performed by positioning the mobile station.

3. The method of claim 1 wherein the positioning of the identifiable object is performed by manually informing the service provider about the position of the object found.

4. The method of claim 1 wherein a service product is in the user device.

5. The method of claim 1 wherein the service is requested from the service provider via a public network.

6. The method of claim 1 wherein characteristics are presented to the user device.

7. The method according to claim 1 wherein the selection message further comprises information of terminal capabilities.

8. The method according to claim 1 wherein the service provider fetches information on the basis of time information.

9. The method according to claim 7 wherein the fetched information is presented to the user device on a basis of the terminal capabilities.

10. A system for identification of an object on a basis of a position and one or more properties, comprising:
    a user device in communication with a service provider via a public network,
    the service provider having a database, the database containing a plurality of objects classified on a basis of characteristics in a hierarchic system of sub-menus,
    the user device being in communication with a global positioning system, the user device being in a position,
    the user device having sending means for sending a request message to the service provider to request a service to identify objects,
    the service provider having means for receiving the request message and selecting identifiable objects based on the position of the user device,
    the service providing having means for providing a menu with identifiable objects,
    the service provider having means for providing characteristics of the identifiable objects,
    the user device having means for selecting an identifiable object and characteristics from the menu,
    the service provider having means for selecting a local database based on the characteristics of the selected identifiable objects and positions of the user device,
    the service provider having means for searching the selected local database and matching the characteristics of the selected identifiable object with characteristics of objects in the selected local database,
    the service provider having means for selecting an object and alternative objects from the local database that match the characteristics of the identifiable object, and
    the service provider having means for sending information about the selected object and the alternative objects to the user device.

11. The system according to claim 10 wherein the user device is a mobile station.

12. The system according to claim 11 wherein the mobile station is a GSM phone.

13. The system according to claim 10 wherein a service product is in the user device.

14. The system according to claim 10 wherein the local database has a plurality of sub-menus.

15. The system according to claim 14 wherein the user device is in connection with the service provider through Internet.

16. The system according to claim 10 wherein the database consists of an object menu for each local database and sub-menus on different levels for the object menu.

17. The system according to claim 16 wherein the system has local databases for different regions in a country.

18. The system according to claim 10 wherein the objects are classified in the database on a basis of different characteristics in a hierarchic system by using submenus.

19. The system according to claim 18 wherein the sub-menus contain images, text or photographs of the objects.

* * * * *